No. 753,884. Patented March 8, 1904.

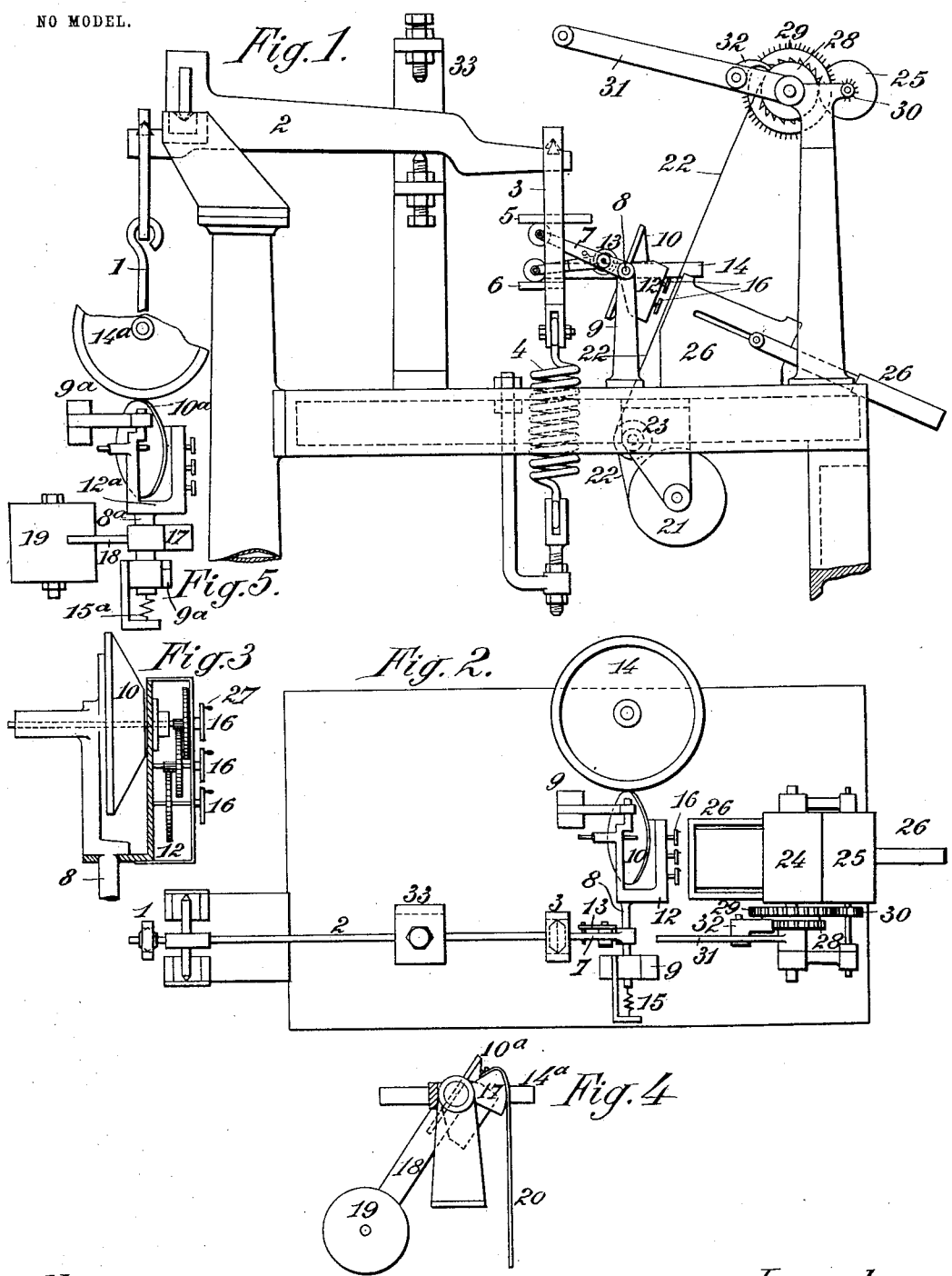

UNITED STATES PATENT OFFICE.

WILHELM HOLZER, OF DARMSTADT, GERMANY.

MACHINE FOR WEIGHING WAGONS, &c.

SPECIFICATION forming part of Letters Patent No. 753,884, dated March 8, 1904.

Application filed March 25, 1902. Serial No. 99,861. (No model.)

*To all whom it may concern:*

Be it known that I, WILHELM HOLZER, a subject of the Emperor of Germany, residing at Nieder Ramstadt, Darmstadt, Germany, have invented certain new and useful Improvements in Machines for Weighing Wagons and Like Objects, of which the following is a specification.

The present invention relates to improvements in balances for weighing wagons, carts, and the like in motion.

Figure 1 is a front view of the upper part of the apparatus. Fig. 2 is a plan view of Fig. 1. Fig. 3 is a detail, on an enlarged scale, seen from above, partly in section. Fig. 4 is a view of a second arrangement. Fig. 5 is a plan view showing the arrangement according to Fig. 4.

As in ordinary balances, the weight of the load is transmitted by means of a system of levers from the roller-bridge to the rod 1. The transmission-levers, as well as the roller-bridge, are not shown in the drawings, since they present no particular features. The spring 4, which is arranged on the frame and the tension of which is adapted to be adjusted, serves as counterpoise for the load to be weighed. The spring 4 engages the beam 2 by means of the rod 3. The latter is fork-shaped and is provided with the rigidly-arranged studs 5 and 6, which serve as guides to the friction-rollers fastened on the ends of the lever 7. The latter is arranged on the axle 8 and consists of two parts, which are held apart by the spring 13. The axle 8 is movably arranged in the longitudinal direction in two bearings 9 and is shaped in such a manner as to serve as bearing for the disk 10. It carries also a casing 12, containing a device for recording the number of revolutions of the disk 10. The spring 15 presses the axle 8 and disk 10 against the disk 14, which is separately arranged on the frame.

The operation of the balance is as follows: On a load being brought on the roller-bridge the beam 2 is caused to turn, at the same time causing the axle 8 and disk 10 to turn by means of the studs 5 6 and lever 7, thus changing the angle between the axles of the disks 8 and 14. On any desired revolution being imparted to the disk 14 the said revolution is transmitted to the disk 10 in direct ratio to the sine of the angle at which the axles of the two disks deviate from the rectangular position with respect to each other. The sine of the said angle is, however, in direct proportion to the extension of the spring 4 due to the load. The transmission of the motion of the beam to the axle 8 is effected by lever connection. Thus it follows that the number of revolutions of the disk 10 is in direct ratio to the turning of the beam, and consequently, since the tension of the spring increases in proportion to the turning of the beam, proportional to the load. With corresponding graduation of the counting-disks 16 the number of revolutions indicated by the recording device can consequently serve as direct indicator of the weight if the same revolution is imparted to the disk 14 for each weighing.

The relation between the motion of the disk 10 and the load can also be obtained in another manner, as shown in Figs. 4 and 5. The axle $8^a$ is also movably arranged in the longitudinal direction in the bearings $9^a$ and carries also the disk $10^a$ and casing $12^a$ of the counting device and is likewise pressed by the spring $15^a$ against the disk $14^a$, and the disk $14^a$ performs also a determined number of revolutions for each weighing, as described above. It differs, however, in so far that it is provided with a rigidly-arranged sector 17, the center of which coincides with the center of the axle $8^a$, and also a lever 18, having a counterweight 19. On the sector is arranged a thin band 20, which is wound off on the sector when the axle $8^a$ is turned. The load to be weighed is connected with the said band 20 in exactly the same manner as with the drawing-rod 1.

According to this construction the moment-arm of the counterweight 19 increases when the axle $8^a$ is turned in the same way as the sine of the deviation angle of the axle $8^a$, whereas the momentum of the load by the winding off of the band on the sector remains unchanged. The load is thus in direct ratio to the sine of the deviation angle, and consequently proportional to the revolution of the disk 10ª.

Owing to the fact that the transmission of the revolution of the disk 14 on the disk 10 is rather uncertain when the two axles are nearly at right angles to each other and can easily be so influenced by the disks accidentally sliding on each other as to give an erroneous result, the disk 10 is previously—*i. e.*, before the load is put on the balance—turned toward the said rectangular position, it being, however, necessary that the disk 10 and counting device should have for each weighing a constant lead, which is invariably to be deducted from the result given by the counter in order to ascertain the weight.

In order to print off the result of the weighing, the following arrangement is used.

21 is a movably-arranged paper-roller from which passes a paper strip 22 over the roller 23, close by the disk 16, and over the rollers 24 and 25. In order to render the drawings more easily understood, the said strip of paper is not shown in Fig. 2.

26 is an ordinary stamp which is arranged on the frame and the surface of which shows a dial-plate which produces an impression on the right side of the paper on the stamp being pressed concentrically to the disks 16. The paper is at the same time pressed against the disk 16 and there perforated by the pins 27, which are arranged in the said disks. According to the result of the weighing, the said holes or perforations will then show on the dial-plates printed on the paper by the stamp an advanced position with respect to their original position, thus giving a printed result of the weighing.

The ratchet-wheel 28, toothed wheels 29 and 30, and roller 25 are arranged on their axles and movably connected therewith, while the roller 24 is loosely mounted on its axle. The lever 31, with the latch 32, is likewise loosely mounted on its axle and is so arranged that on moving downwardly it bears on the lever system 3, by this means bringing the beam and all parts connected therewith, including the disks 16, into their position of non-operation, which is determined by the abutment 33. For purposes of greater clearness the lever 31 is shown broken off in Fig. 2. The paper 22 is passed between the two rollers 24 and 25, which are arranged so close against each other that they press both against the paper, the latter thus being carried along when the rollers turn.

When the weighing is completed, the lever 31 is pressed down, by which the disks 16 are brought into the desired printing position. The stamp 26 is then actuated and immediately released, whereupon the lever 31 is brought back into the position shown in the drawings. On the lever 31 returning, the paper is moved upwardly, so that the print of the dial-plate with the weighing result appears above the stamp, by which the paper is also put in the proper position for the next weighing. The lever 31 is then held in its position until the next operation by means of any suitable device. (Not shown in the drawings.)

The disk 14 may be turned in any well-known manner by mechanism (not shown) which will impart to it a uniform motion.

I claim—

1. In combination with the transmission-beam, a rod connected with said beam, lugs carried by the said rod, a disk pivotally mounted and having an arm adapted to be engaged by said lugs, means for rotating said disk, and an indicating means actuated by the said disk.

2. In a weighing device, the combination of a rotary disk, an indicating-disk adapted to be operated thereby, and means for causing said indicating-disk to assume different inclinations, said means comprising an arm, a rod provided with lugs adapted to engage said arm and means for actuating said rod, substantially as described.

In testimony whereof I have hereunto set my hand in the presence of two witnesses.

WILHELM HOLZER. [L. S.]

Witnesses:
    WALTER SCHUMANN,
    WALTER HAUSIEZ.